United States Patent
Inatsuka et al.

(10) Patent No.: US 9,650,050 B2
(45) Date of Patent: May 16, 2017

(54) DRIVING SUPPORT SYSTEM, DRIVING SUPPORT METHOD AND COMPUTER-READABLE STORAGE MEDIUM STORING PROGRAM

(71) Applicant: ZENRIN CO., LTD., Fukuoka (JP)

(72) Inventors: Hiroyuki Inatsuka, Fukuoka (JP); Shinji Ogata, Fukuoka (JP); Hiroyuki Ohara, Fukuoka (JP); Junichi Nakamura; Tatsuya Yuba, San Bruno, CA (US)

(73) Assignee: ZENRIN CO., LTD., Fukuoka (JP)

( * ) Notice: Subject to any disclaimer, the term of this patent is extended or adjusted under 35 U.S.C. 154(b) by 0 days.

(21) Appl. No.: 14/814,871

(22) Filed: Jul. 31, 2015

(65) Prior Publication Data

US 2016/0046293 A1   Feb. 18, 2016

(30) Foreign Application Priority Data

Aug. 12, 2014  (JP) ................. 2014-164036

(51) Int. Cl.
*G06G 7/76* (2006.01)
*G08G 1/00* (2006.01)
(Continued)

(52) U.S. Cl.
CPC ............ *B60W 40/04* (2013.01); *B60W 10/18* (2013.01); *B60W 10/20* (2013.01); *B60W 10/30* (2013.01);
(Continued)

(58) Field of Classification Search
USPC ........... 701/117–119, 70; 340/992, 907, 915, 340/909, 905, 936, 901, 929
See application file for complete search history.

(56) References Cited

U.S. PATENT DOCUMENTS 6,879,263 B2 * 4/2005 Pederson ............ B60Q 1/2611
   340/815.45
7,663,505 B2 * 2/2010 Publicover ............ G08G 1/095
   340/907
(Continued)

FOREIGN PATENT DOCUMENTS

JP         2008-242986        10/2008
JP   PCT/JP2008/067960    * 4/2009 ............ G08G 1/052
(Continued)

OTHER PUBLICATIONS

Research on modeling and optimization of overtaking rules under intelligent system; Hai Liu; Yu-ping Sun; Yunjian Ge Information and Automation, 2015 IEEE International Conference on; Year: 2015; pp. 3079-3083, DOI: 10.1109/ICInfA.2015.7279817.*
(Continued)

*Primary Examiner* — Cuong H Nguyen
(74) *Attorney, Agent, or Firm* — Paratus Law Group, PLLC

(57) ABSTRACT

A driving support system includes a detector, a memory and a controller. The detector detects a present position of the vehicle. The memory stores lane information of a travelling lane and traffic light information in a state of being associated with each other. The traffic light information includes existing position information of a traffic light. The traffic light informs whether the vehicle travelling along the travelling lane is allowed to pass through the traffic light. The controller specifies the travelling lane on which the vehicle is travelling based on the lane information and the present position and supports the driving of the vehicle in accordance with the traffic light information and the traffic light associated with the travelling lane.

14 Claims, 9 Drawing Sheets

(51) Int. Cl.
  B60W 40/04   (2006.01)
  B60W 10/20   (2006.01)
  B60W 10/18   (2012.01)
  B60W 10/30   (2006.01)
  G08G 1/0967  (2006.01)

(52) U.S. Cl.
  CPC . *G08G 1/096716* (2013.01); *G08G 1/096741* (2013.01); *B60W 2400/00* (2013.01); *B60W 2550/20* (2013.01); *B60W 2550/22* (2013.01); *B60W 2710/30* (2013.01)

(56) References Cited

U.S. PATENT DOCUMENTS

| | | | | |
|---|---|---|---|---|
| 8,352,112 | B2* | 1/2013 | Mudalige | G08G 1/163 340/435 |
| 8,660,782 | B2* | 2/2014 | Vang | G08G 1/0962 180/171 |
| 8,972,076 | B2* | 3/2015 | Ogawa | G08G 1/096716 340/901 |
| 2005/0231381 | A1* | 10/2005 | Pederson | B60Q 1/2611 340/815.45 |
| 2007/0027583 | A1* | 2/2007 | Tamir | G06Q 30/0283 701/1 |
| 2008/0136661 | A1* | 6/2008 | Pederson | B60Q 1/2611 340/815.45 |
| 2010/0004839 | A1* | 1/2010 | Yokoyama | G08G 1/052 701/70 |
| 2010/0070128 | A1* | 3/2010 | Johnson | G08G 1/096783 701/31.4 |
| 2010/0305804 | A1* | 12/2010 | Taguchi | G06F 7/00 701/31.4 |
| 2011/0246051 | A1* | 10/2011 | Vang | G08G 1/0962 701/117 |
| 2013/0110316 | A1* | 5/2013 | Ogawa | G08G 1/096716 701/1 |
| 2014/0032090 | A1* | 1/2014 | Ono | G06F 17/00 701/119 |
| 2014/0163848 | A1* | 6/2014 | Tamir | G06Q 30/0283 701/117 |

FOREIGN PATENT DOCUMENTS

| | | | | |
|---|---|---|---|---|
| JP | 2011-240591 | * | 11/2011 | G08G 1/096716 |
| JP | 2012-167641 | * | 7/2012 | G06F 17/00 |
| JP | DE 102012219922 A1 | * | 5/2013 | G08G 1/096716 |
| JP | 5397452 B2 | * | 1/2014 | G08G 1/096716 |
| JP | DE 102012219922 B4 | * | 1/2014 | G08G 1/096716 |
| KR | 2009044635 A | * | 5/2009 | G08G 1/09 |
| KR | 1431264 B1 | * | 8/2014 | G08G 1/095 |
| WO | WO2009/048015 | * | 4/2009 | G08G 1/052 |

OTHER PUBLICATIONS

A Cellular Automata Simulation on Multi-lane Traffic Flow for Designing Effective Rules; Chongyuan Tao; Jian Zhang Industrial Informatics—Computing Technology, Intelligent Technology, Industrial Information Integration (ICIICII), 2015 International Conference on; Year: 2015; pp. 209-212, DOI: 10.1109/ICIICII.2015.134.*

Performance of the Roadside Tracker Portal-Less Portal Monitor;K. P. Ziock; E. C. Bradley; A. Cheriyadat; M. Cunningham; L. Fabris; C. L. Fitzgerald; J. S. Goddard; D. E. Hornback; R. A. Kerekes; T. P. Karnowski; W. T. Marchant; J. Newby;IEEE Transactions on Nuclear Science; Year: 2013, vol. 60, Issue: 3; pp. 2237-2246, DOI: 10.1109/TNS.2.*

Real time lane detection for autonomous vehicles; Abdulhakam. AM. Assidiq; Othman O. Khalifa; Md. Rafiqul Islam; Sheroz Khan Computer and Communication Engineering, 2008. ICCCE 2008. International Conference on; Year: 2008; pp. 82-88, DOI: 10.1109/ICCCE.2008.4580573.*

Vision-Based Lane Detection for Autonomous Artificial Intelligent Vehicles; Othman O. Khalifa; Aisha-Hassan A. Hashim; Abdulhakam A. M. Assidiq; Semantic Computing, 2009. ICSC '09. IEEE International Conference on; Year: 2009 pp. 636-641, DOI: 10.1109/ICSC.2009.113.*

Vision Based for Lane Change Decision Aid System; Eui Yoon Chung; Ho Choul Jung; Eugene Chang; In Sik Lee; 2006 International Forum on Strategic Technology; Year: 2006; pp. 10-13, DOI: 10.1109/IFOST.2006.312232.*

Platooning: Connected Vehicles for Safety and Efficiency [Connected Vehicles] ; Elisabeth Uhlemann; IEEE Vehicular Technology Magazine; Year: 2016, vol. 11, Issue: 3; pp. 13-18, DOI: 10.1109/MVT.2016.2583140.*

Predictive Guidance and Control Framework for (Semi-)Autonomous Vehicles in Public Traffic; Thomas Weiskircher; Qian Wang; Beshah Ayalew; IEEE Transactions on Control Systems Technology; Year: 2017, vol. PP, Issue: 99; pp. 1-13, DOI: 10.1109/TCST.2016.2642164.*

A road sign detection and the recognition for Driver Assistance Systems; Amol Jayant Kale; R. C. Mahajan; 2015 International Conference on Energy Systems and Applications; Year: 2015; pp. 69-74, DOI: 10.1109/ICESA.2015.7503315.*

Increasing traffic safety during single lane passing using wireless sensor networks; Unnikrishnan H.; Vishnu Narayanan B.; Alin Devassy Ananyase; Anand Ramachandran; 2015 International Conference on Advances in Computing, Communications and Informatics (ICACCI); Year: 2015; pp. 2103-2107, DOI: 10.1109/ICACC1.2015.7275927.*

Bigdata analytics on CCTV images for collecting traffic information; Hyeongsoon Im; Bonghee Hong; Seungwoo Jeon; Jaegi Hong; 2016 International Conference on Big Data and Smart Computing (BigComp); Year: 2016; pp. 525-528, DOI: 10.1109/BIGCOMP.2016.7425985.*

Threat prediction algorithm based on local path candidates and surrounding vehicle trajectory predictions for automated driving vehicles;Jae-Hwan Kim; Dong-Suk Kum;2015 IEEE Intelligent Vehicles Symposium (IV); Year: 2015; pp. 1220-1225, DOI: 10.1109/IVS.2015.7225849.*

A concept for a C2X-based crossroad assistant;Daniel Burgstahler; Matthias Pelzer; Andreas Lotz; Fabian Knapp; Hongjun Pu; Tobias Rueckelt; Ralf Steinmetz;2015 IEEE International Conference on Pervasive Computing and Communication Workshops (PerCom Workshops); Year: 2015; pp. 360-364, DOI: 10-1109/PERCOMW.2015.71340.*

* cited by examiner

DRIVING SUPPORT SYSTEM, DRIVING SUPPORT METHOD AND COMPUTER-READABLE STORAGE MEDIUM STORING PROGRAM

CROSS-REFERENCE TO RELATED APPLICATION

This application claims priority based on Japanese Patent Application No. 2014-164036, filed on Aug. 12, 2014, the entire contents of which are incorporated by reference herein.

BACKGROUND OF THE INVENTION

1. Field of the Invention

The present invention relates to a driving support system, a driving support method and a computer-readable storage medium storing program.

2. Related Art

There is a driving support method for supporting the driving of a vehicle. As a related art, there is a method that includes a process of detecting an own vehicle's travelling lane and a process of photographing a traffic light in front of the own vehicle and supports the driving in response to the instructions of an arrow signal lamp of the traffic light (JP-A-2008-242986).

However, in the related art, there is a possibility that a traffic light other than a traffic light corresponding to the own vehicle's travelling lane can be mistaken for the traffic light of the own vehicle's travelling lane when multiple traffic lights can be confirmed from the own vehicle's travelling lane. As a result, in the related art, there is a possibility that an erroneous driving support can be performed. In addition, in the conventional driving support system, an easy operation, improvement in usability, improvement in processing speed, cost reduction, and resource saving, etc., have been demanded.

SUMMARY OF THE INVENTION

The present invention solves at least some of the above-described problems and can be realized as the following aspects or application examples.

(1) According to one aspect of the present invention, a driving support system for supporting the driving of a vehicle is provided. The driving support system includes a detector, a memory and a controller. The detector detects a present position of the vehicle. The memory stores lane information of a travelling lane and traffic light information in a state of being associated with each other. The traffic light information includes existing position information of a traffic light. The traffic light informs whether the vehicle travelling along the travelling lane is allowed to pass through the traffic light. The controller specifies the travelling lane on which the vehicle is travelling based on the lane information and the present position and supports the driving of the vehicle in accordance with the traffic light information and the traffic light associated with the travelling lane. According to the driving support system of the present aspect, the driving support of the vehicle can be performed in accordance with the traffic light associated with the travelling lane even when there are multiple traffic lights in a travelling direction of a vehicle.

(2) In the driving support system of (1), the controller supports the driving of the vehicle by informing a vehicle driver of the traffic light or by controlling an accelerator or a brake of the vehicle (3) According to another aspect of the present invention, a driving support system for supporting the driving of a vehicle is provided. The driving support system includes a detector, a memory, a recognition unit and a controller. The detector detects a present position of the vehicle. The controller specifies the travelling lane on which the vehicle is travelling based on the lane information and the present position and supports the driving of the vehicle in accordance with the traffic light information and the traffic light associated with the travelling lane. The traffic light information includes existing position information of a traffic light. The traffic light informs whether the vehicle travelling along the travelling lane is allowed to pass through the traffic light. The recognition unit recognizes a display content of the traffic light. The controller specifies the travelling lane on which the vehicle is travelling based on the lane information and the present position and that supports the driving of the vehicle in accordance with the traffic information and the display content of the traffic light associated with the travelling lane. According to the driving support system of the present aspect, the driving support of the vehicle can be performed in response to the display content of the traffic light associated with the travelling lane even when there are multiple traffic lights in a travelling direction of a vehicle.

(4) in the driving support system of (3), the memory further stores stop line position information indicating a position of a stop line associated with the traffic light. The controller supports the driving of the vehicle so as to stop the vehicle at the position of the stop line associated with the traffic light when the recognition unit recognizes the display content of the traffic light as a display content which prompts to stop the vehicle. According to the driving support system of the present aspect, the driving of the vehicle can be supported so that the vehicle is stopped at the position of the stop line associated with the traffic light when the display content of the traffic light associated with the travelling lane is identified as a display content for prompting to stop the vehicle.

(5) In the driving support system of (3), the controller supports the driving of the vehicle by informing a vehicle driver of the traffic light or by controlling an accelerator or a brake of the vehicle.

(6) According to further another aspect of the present invention, a driving support method for supporting a driving of a vehicle, includes: detecting a present position of the vehicle; storing lane information of a travelling lane and traffic light information in a state of being associated with each other, the traffic light information including existing position information of a traffic light. The traffic light informs whether the vehicle travelling along the travelling lane is allowed to pass through the traffic light.; specifying the travelling lane on which the vehicle is travelling based on the lane information and the present position; and supporting the driving of the vehicle in accordance with the traffic light information and the traffic light associated with the travelling lane.

(7) According to further another aspect of the present invention, a non-transitory computer-readable storage medium stores program fur causing at least one processor to execute operations of supporting a driving of a vehicle. The operations comprises: storing lane information of a travelling lane; and storing traffic light information that includes existing position information of a traffic light, the traffic light which informs whether the vehicle travelling along the travelling lane is allowed to pass through the traffic light; and associating the lane information with the traffic light information.

The present invention can be realized in various aspects other than the driving support system or the data structure. For example, the present invention may be realized in the aspects such as a driving support device, a driving support method, a computer program for implementing the driving support method and a non-transitory recording medium for recording the computer program.

DETAILED DESCRIPTION OF THE INVENTION

Figure 1:
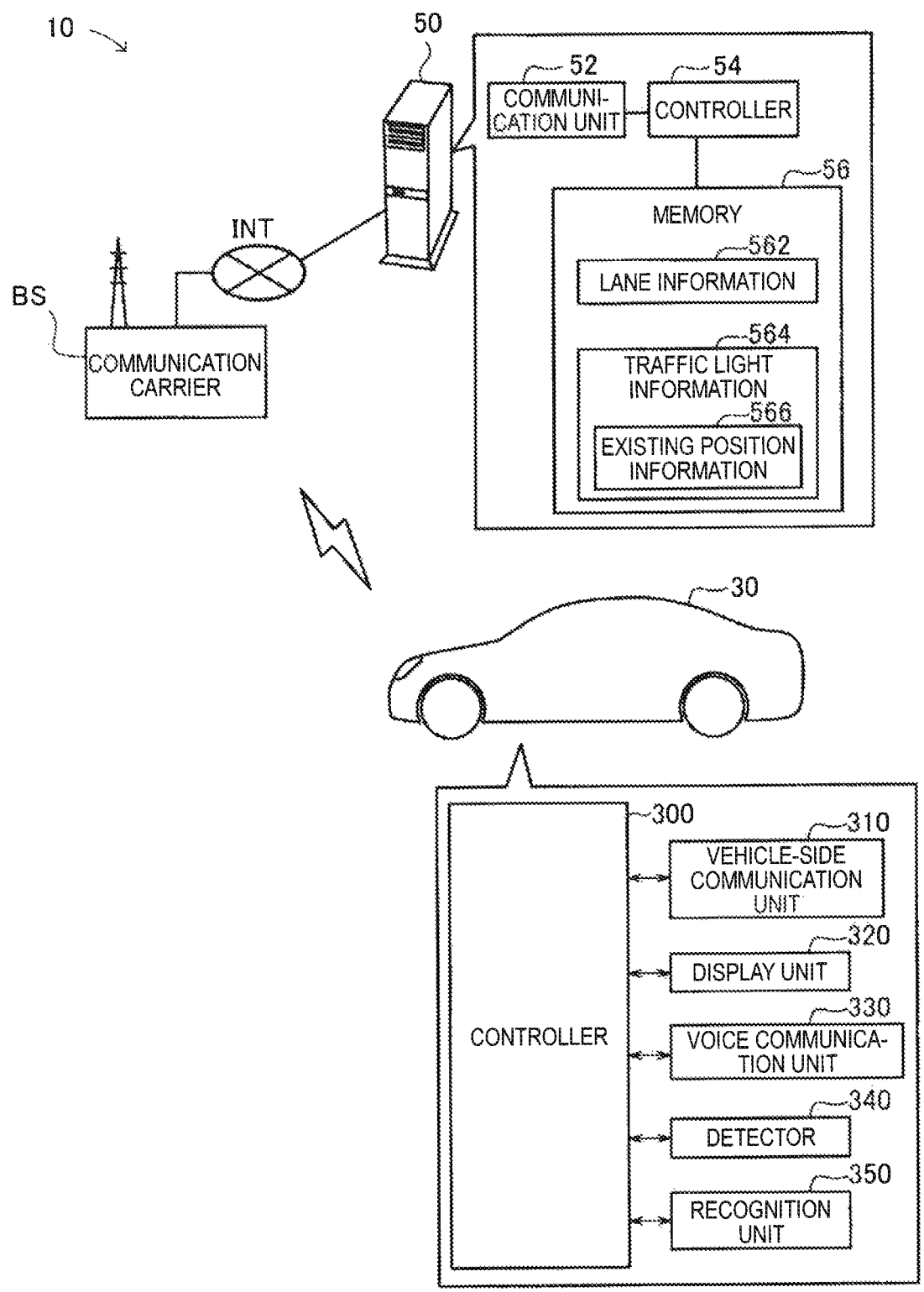
FIG. 1 is a view for explaining a configuration of a driving support 10 as an illustrative embodiment of the present invention.

A. First Embodiment:
A1. System Configuration:

FIG. 1 is a view for explaining a configuration of a driving support system 10 as an illustrative embodiment of the present invention. The driving support system 10 is a driving support system for supporting the driving of a vehicle 30. The driving support system 10 includes a server 50 and the vehicle 30. The vehicle 30 and the server 50 are communicatively connected to each other via an internet INT as a communication Here, a communication carrier BS includes a transceiver antenna, a wireless base station and an exchange station.

The vehicle 30 includes a controller 300, a vehicle-side communication unit 310, a display unit 320, a voice communication unit 330, a detector 340 and a recognition unit 350. The controller 300 includes a RAM and a ROM. The controller 300 controls each unit of the vehicle 30 by loading, to the RAM, a control program stored in the ROM and implementing the control program. More specifically, the controller 300 also performs the control for an accelerator or a brake or the like, in addition to the vehicle-side communication unit 310, the display unit 320 and the voice communication unit 330.

The vehicle-side communication unit 310 is a device for communicating with the server 50 via the Internet NT, by the control of the controller 300. The display unit 320 is a device for displaying various images such as a map image. The voice communication unit 330 is configured by a speaker for outputting a voice or a microphone for inputting the voice, and a circuit for driving these parts, etc. The detector 340 detects the present position of the vehicle 30, based on the radio waves received from a satellite that constitutes a GPS (Global Positioning System). The recognition unit 350 is a device for recognizing the display content of the traffic light. In the present embodiment, a CCD camera is used as the recognition unit 350.

The server 50 includes a communication unit 52, a controller 54 and a memory 56. The controller 54 includes a RAM and a ROM. The controller 54 controls each unit of the server 50 by loading, to the RAM, a control program stored in the ROM and implementing the control program. The communication unit 52 is a device for communicating with the vehicle 30 via the internet INT, by the control of the controller 54, in the present embodiment, the memory 56 is configured by a hard disk.

In the memory 56, lane information 562 and traffic light information 564 are stored in a state of being associated with each other. The lane information 562 refers to information of a travelling lane. The traffic light information 564 includes existing position information 566, The existing position information 566 indicates the position of a traffic light. The traffic light informs whether a vehicle travelling along the travelling lane is allowed to pass through the traffic light. Such data structure refers to a data structure of a road network data that is used for supporting the driving of a vehicle. According to this data structure, it is possible to specify the existing position of the traffic light corresponding to the lane, based on the lane information.

Figure 2:
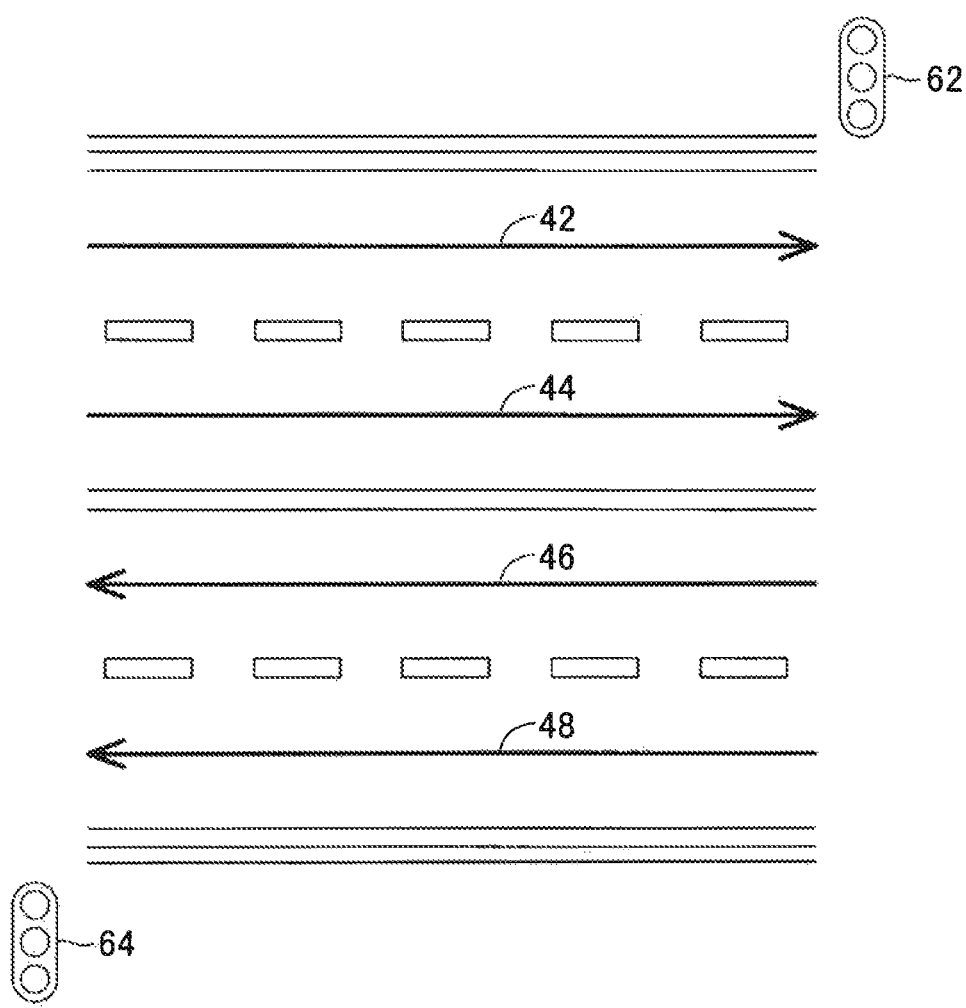
FIG. 2 is a view for explaining lane information 562.

FIG. 2 is a view for explaining the lane information 562. In FIG. 2, a total of four lanes with two lanes on each side are shown. The lane information 562 indicates the information for each lane. Specifically, the memory 56 stores, as the lane information 562, the information on each of the lanes 42, 44, 46, 48. In the present embodiment, the lane information 562 includes position information for each predetermined interval of an imaginary line (center line) defining the center of each lane. Further, the memory 56 stores, as the existing position information of the traffic light, each position information in the places where the traffic lights 62, 64 are present. The traffic light information 564 and the lane information 562 are associated with each other. Specifically, the lane information of the lane 42 and the lane information of the lane 44 are respectively associated with the existing position information of the traffic light 62. That is, the information of the lane 42, the information of the lane 44 and the existing position information of the traffic light 62 are associated with each other so that it defines that the traffic light corresponding to the lanes 42, 44 is the traffic light 62. The lane information of the lane 46 and the lane information of the lane 48 are respectively associated with the existing position information of the traffic light 64. That is, the information of the lane 46, the information of the lane 48 and the existing position information of the traffic light 64 are associated with each other so that it defines that the traffic light corresponding to the lanes 46, 48 is the traffic light 64. Meanwhile, the existing position information of the traffic light also includes height information that indicates the installation height of the traffic light, in addition to the latitude and longitude information of the traffic light.

A2. Driving Support Process

Figure 3:
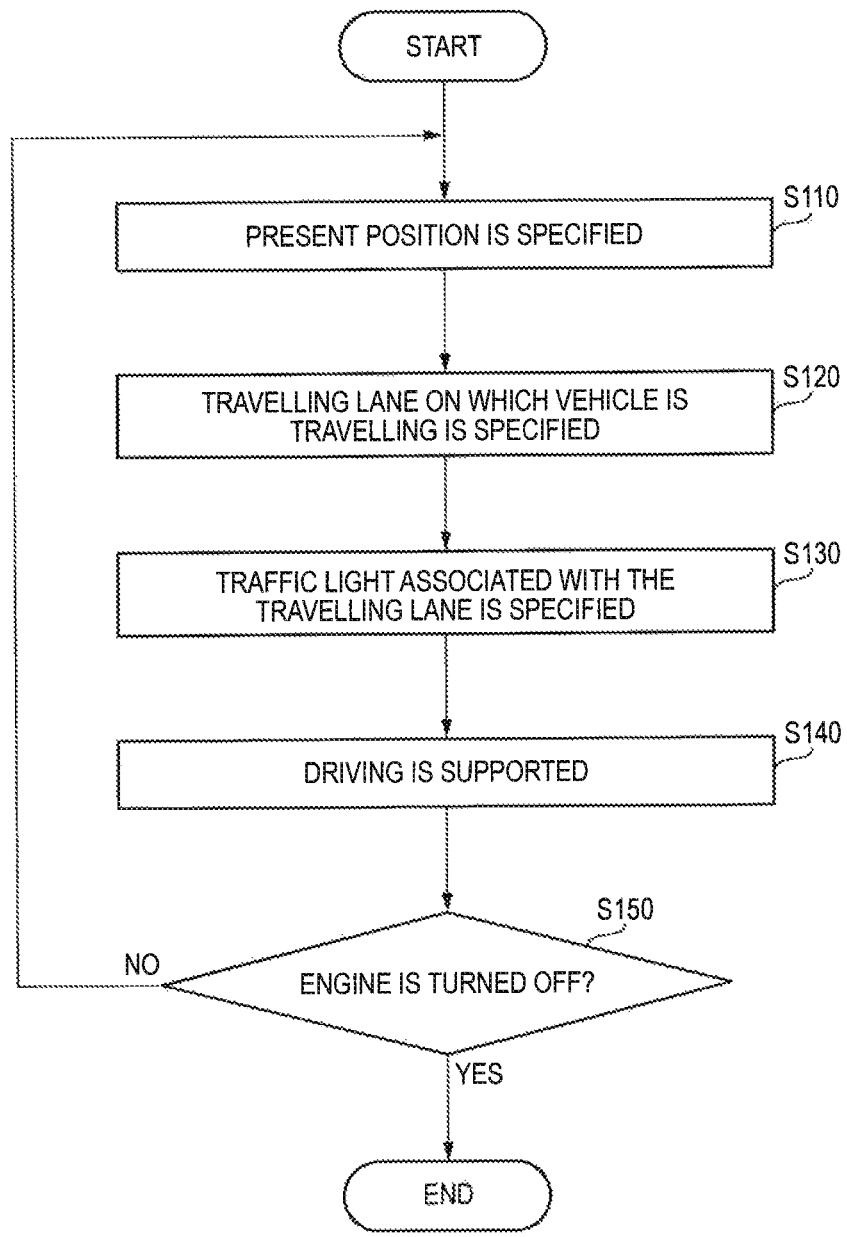
FIG. 3 is a flow chart for explaining a driving support process in a first embodiment.

FIG. 3 is a flow chart for explaining a driving support process in the first embodiment. In the present embodiment, the driving support process is started when an engine of the vehicle 30 is activated.

As the driving support process is started, at Step S110, the controller 300 of the vehicle 30 specifies the present position of the vehicle 30 by the detector 340. Then, at Step S 120, the controller 300 specifies the lane of the road closest to the present position as a travelling lane on which the vehicle 30 is travelling, by referring to the lane information 562 of the memory 56.

After the travelling lane of the vehicle 30 is specified, at Step S130, the controller 300 confirms the presence or absence of the traffic light that is associated with the travelling lane of the vehicle 30, by referring to the traffic light information 564 of the memory 56.

When there is a traffic light that is associated with the travelling lane of the vehicle 30, at Step S140, the controller 300 performs the driving support in accordance with the traffic light.

Figure 4:
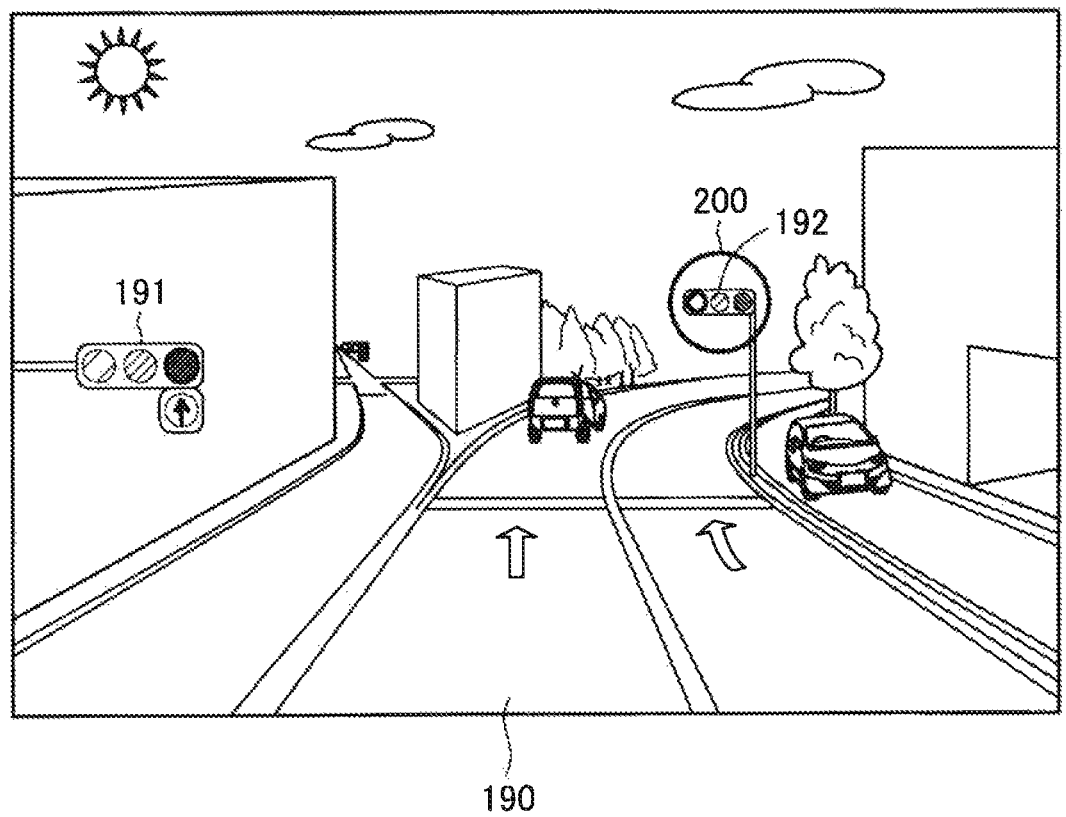
FIG. 4 is a view showing an example of a screen of a display unit 320 at the time of performing the driving support.

FIG. 4 is a view showing an example of a screen of the display unit 320 at the time of performing the driving support. Currently, it is assumed that the vehicle 30 is travelling on a second lane 190 from the left in FIG. 4. In this case, the traffic signal that should be seen by a driver of the vehicle is not the traffic light 191 on the left of FIG. 4 but the traffic light 192 on the right of FIG. 4. Therefore, the controller 300 performs the driving support by processing a part of an image obtained from the detector 340 and causing the driver to recognize the traffic light to be seen. in FIG. 4, the part of the signal lamp of the traffic light 192 to be seen is surrounded with a circle 200, thereby calling a driver's attention. By doing so, the driving support of the vehicle can be performed in accordance with the traffic light associated with the travelling lane even when there are multiple traffic lights in the travelling direction of the vehicle. Further, even when there are the traffic light for a pedestrian or the traffic light for a tram, etc., in the travelling lane of the vehicle, the driving support of the vehicle can he performed in accordance with the traffic light associated with the travelling lane, without following the display content of these traffic lights for a pedestrian or a tram.

Meanwhile, the driving support method is not limited to the display on the display unit 320. For example, the controller 300 may control the voice communication unit 330 so as to call attention to a driver by voice. Further, as the image of the display unit 320 at the time of performing the driving support, an image other than the image obtained from the detector 340 may he used. For example, an image is created by using the lane information 562 and the existing position information 566, which are stored in the memory 56. Then, the created image is displayed on the display unit 320, so that the calling attention to the driver may be performed.

As an engine of the vehicle 30 is turned off, the driving support process is ended. On the other hand, when the engine of the vehicle 30 is not turned off (Step S150: NO), the flow returns to the Step S110 and the driving support process is continued.

B. Second Embodiment:

A driving support system 10 of a second embodiment has the same configuration as the first embodiment. The driving support process of the second embodiment is different from the driving support process of the first embodiment in the steps (process after Step S130) after specifying the traffic light. Other processes are the same, That is, in the second embodiment, the process of Step S240 and Step S245 is performed, instead of the process of Step S140 (driving support) in the first embodiment.

Figure 5:
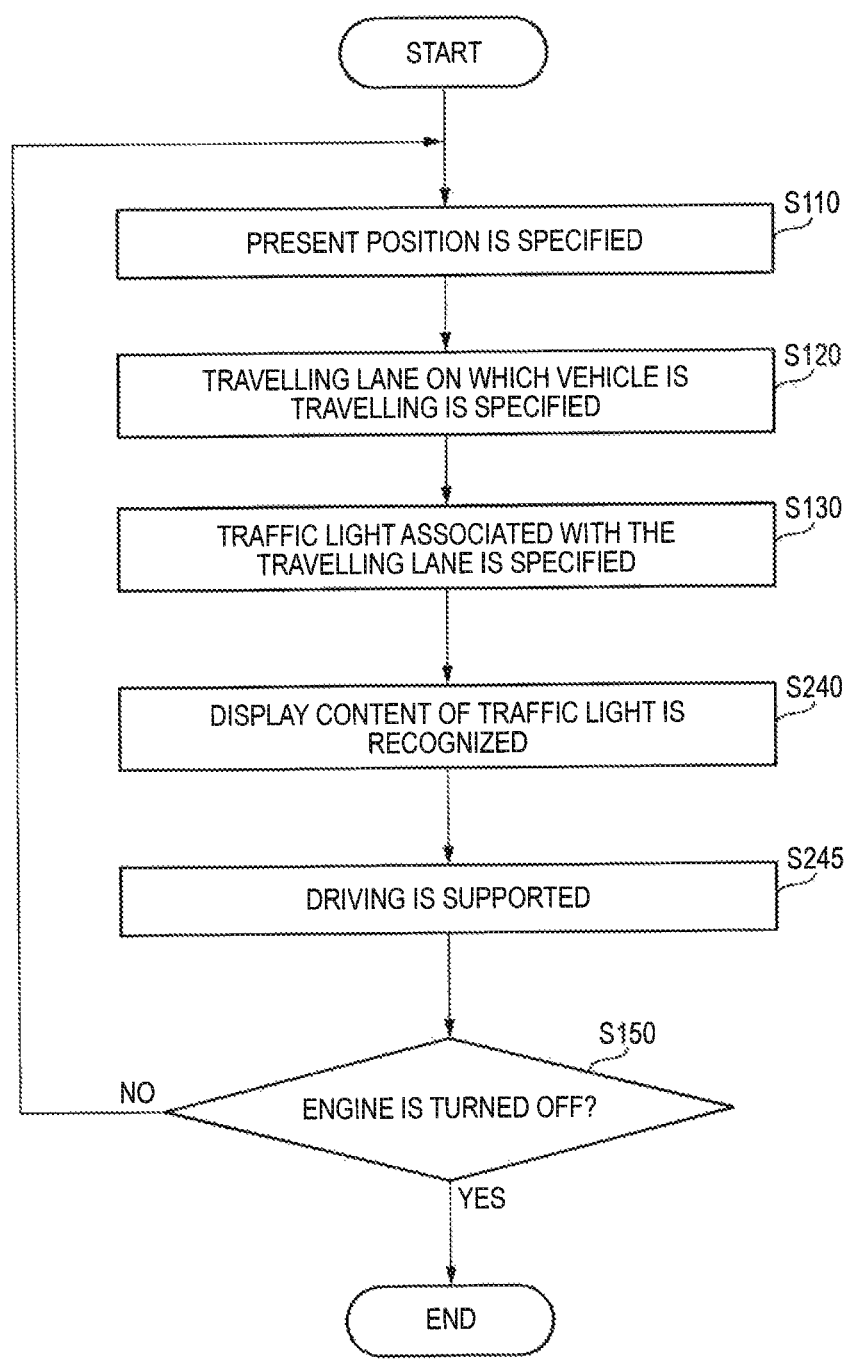
FIG. 5 is a flow chart for explaining a driving support process in a second embodiment.

FIG. 5 is a flow chart for explaining the driving support process in the second embodiment. When there is a traffic light that is associated with the travelling lane of the vehicle 30, at Step S240, the controller 300 recognizes the display content of the traffic light by the recognition unit 350.

Thereafter, at Step S245, the controller 300 performs the driving support of the vehicle in response to the display content of the traffic light. Specifically, when the display content of the traffic light corresponding to the travelling lane of the vehicle 30 is a display content for allowing and prompting the passage of the vehicle (when a green light is turned on), the controller 300 moves the vehicle 30 in the travelling direction by controlling an accelerator of the vehicle 30. On the other hand, when the display content of the traffic light is a display content for allowing and prompting to stop the vehicle (when a red light is turned on), the controller 300 prompts to stop the vehicle by controlling a brake of the vehicle 30. Meanwhile, when an arrow signal lamp indicating the direction of the travelling that can be allowed at the intersection is attached to the traffic light, the driving support of the vehicle is performed in accordance with the display content of the arrow signal lamp. According to this invention, the driving support of the vehicle can be performed in response to the display content of the traffic light associated with the travelling lane even when multiple traffic lights are present in a travelling direction of a vehicle.

Figure 6:
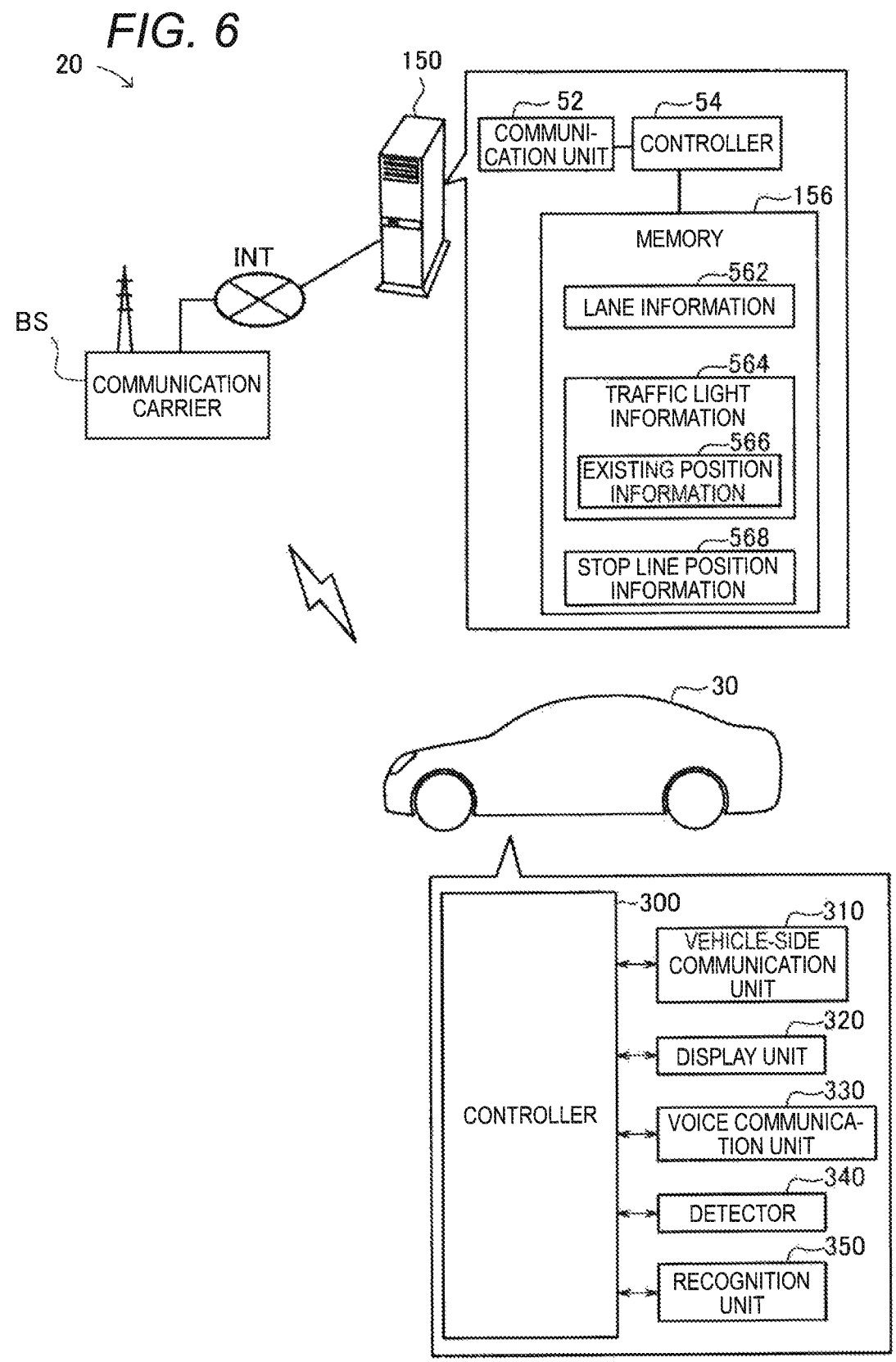
FIG. 6 is a view for explaining a configuration of a driving support system 110 of a third embodiment.

C. Third Embodiment:

FIG. 6 is a view for explaining a configuration of a driving support system 110 of a third embodiment. In addition to the driving support system 10 of the second embodiment, a memory 156 of the driving support system 110 further stores stop line position information 568 that indicates the position of a stop line associated with the traffic light. in other configurations, the driving support system 110 is the same as the driving support system 10.

Figure 7:
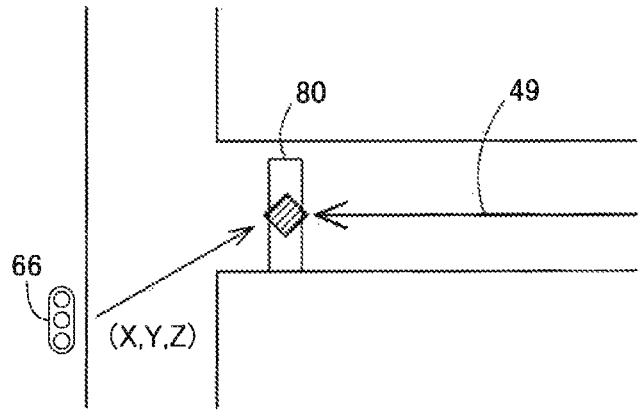
FIG. 7 is a view for explaining stop line position information 568.

FIG. 7 is a view for explaining the stop line position information 568. In FIG. 7, a lane 49, a traffic light 66 and a stop line 80 are shown. The traffic light 66 is a traffic light that is installed for informing whether a vehicle travelling along the travelling lane 49 is allowed to pass through the traffic light. The stop line 80 is a line indicating the line where the vehicle stops when the display content of the traffic light 66 is a display content for prompting to stop the vehicle. When the position information of the traffic light 66 is set as (X, Y, Z), in the stop line position information 568, the position information of the traffic light 66 is associated with the position information of the stop line 80.

Figure 8:
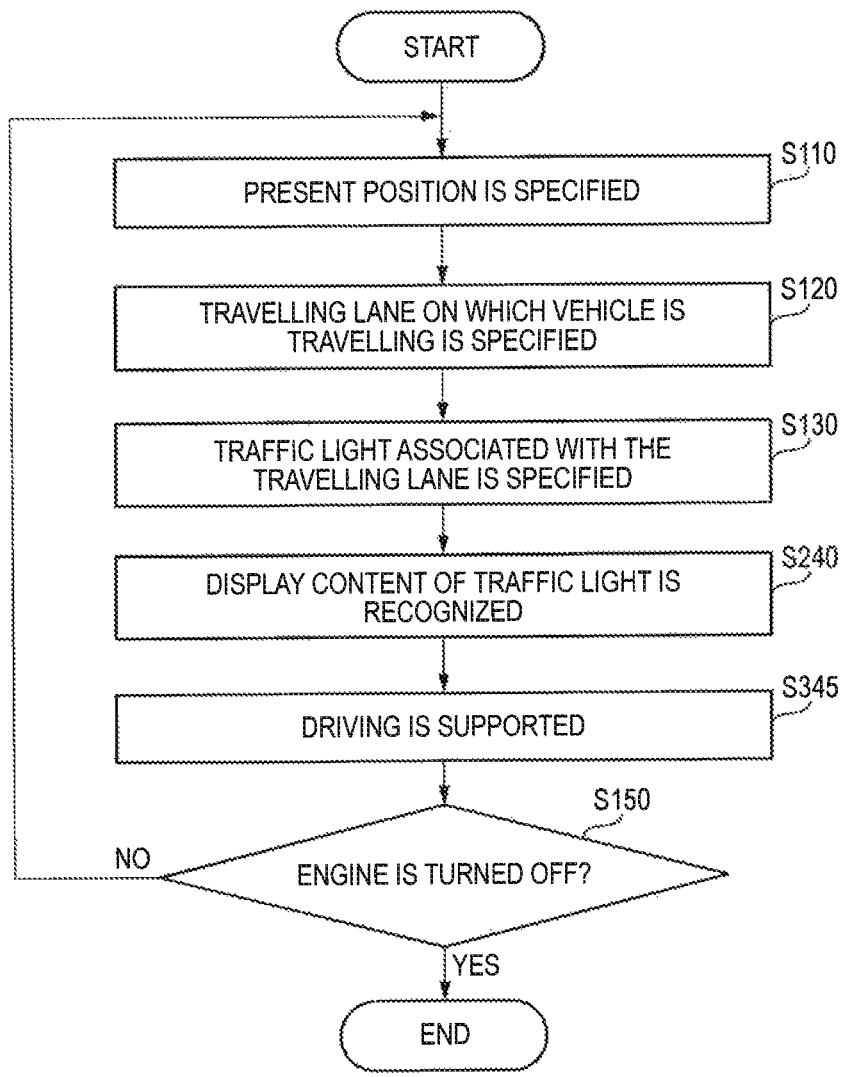
FIG. 8 is a flow chart for explaining a driving support process in the third embodiment.

FIG. 8 is a flow chart for explaining the driving support process in the third embodiment. The driving support process of the third embodiment is different from the driving support process of the second embodiment in that the process of Step S345 is performed, instead of the process of Step S245 (driving support) in the second embodiment. Other processes are the same.

The driving support (Step S345) in the third embodiment is performed as follows. When the recognition unit 350 identifies the display content as a display content for prompting to stop the vehicle 30, the controller 300 supports the driving of the vehicle 30 by controlling the brake so that the vehicle 30 is stopped at the position of the stop line associated with the traffic light. On the other hand, when the display content of the traffic light is not the display content for prompting to stop the vehicle, the same driving support as the driving support in the second embodiment is performed.

Figure 9:
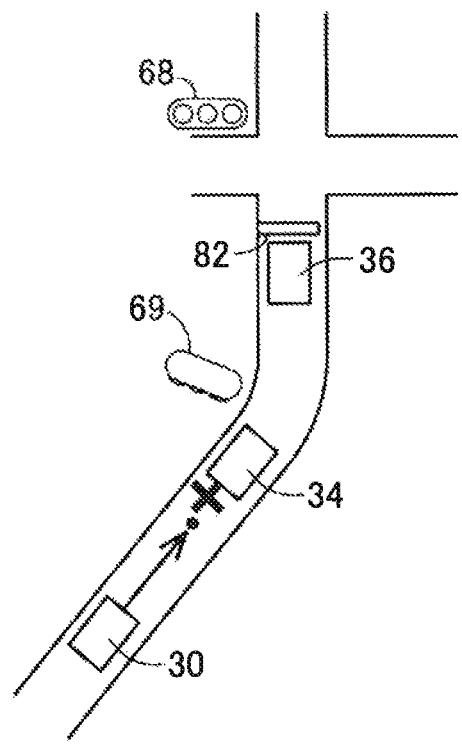
FIG. 9 is a view for explaining the driving support in the third embodiment.

FIG. 9 is a view for explaining the driving support in he third embodiment. In FIG. 9, a stop line 82 and traffic lights 68, 69 are shown. The traffic light 69 is a traffic light indicating the same notification content as the traffic light 68. The traffic light 69 is also referred to as a warning signal lamp. In the case where the installation place of the original traffic light 68 has a poor outlook, it is often too late to stop a vehicle even when a driver recognizes a red signal and attempts to stop the vehicle. Therefore, in such a place, the traffic light 69 is often preliminarily installed as a warning signal lamp at a position that is located before the intersection and has a good outlook. In the present embodiment, the vehicle 30 is assumed to travel on a lane corresponding to the traffic light 68.

In the present embodiment, both of the traffic light 68 and the traffic light 69 are associated with the stop line 82. Therefore, in the present embodiment, the vehicle 30 is not stopped at a position (a position of a vehicle 34) before the traffic light 69, but can be stopped at a correct stop position (a position of a vehicle 36).

Figure 10:
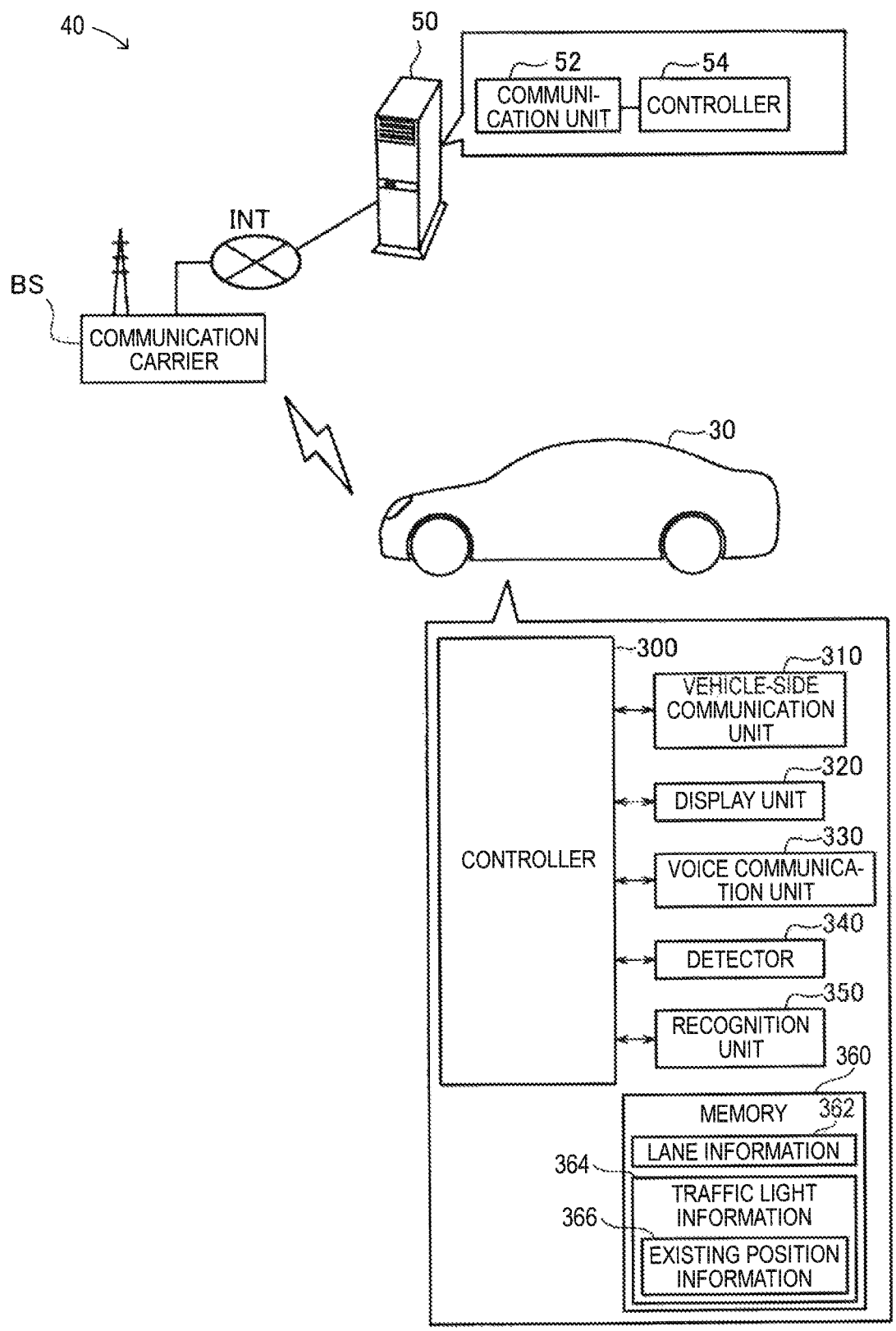
FIG. 10 is a view of explaining a configuration of a driving support system 40 of a fourth embodiment.

FIG. 10 is a view for explaining a configuration of a driving support system 40 as an illustrative embodiment of the present invention. In the driving support system 40, the vehicle 30 includes a controller 300, a vehicle-side communication unit 310, a display unit 320, a voice communication unit 330, a detector 340, a recognition unit 350 and a memory 360. In the memory 360, lane information 362 and traffic light information 364 are stored in a state of being associated with each other. The lane information 362 refers to information of a travelling lane. The traffic light information 364 includes existing position information 366. The existing position information 366 indicates the position of a traffic light. The traffic light informs whether a vehicle travelling along the travelling lane is allowed to pass through the traffic light. Such data structure refers to a data structure of a road network data that is used for supporting the driving of a vehicle. According to this data structure, it is possible to specify the existing position of the traffic light corresponding to the lane, based on the lane information. Other configurations are the same as the first embodiment.

D. Modified Example:

Meanwhile, the present invention is not limited to the above-described embodiments but can be implemented in various aspects without departing from the gist of the invention. For example, the following modifications can be also made.

D1. Modified Example 1:

In the driving support system of the present embodiment, the display unit 320 or the voice communication unit 330 constitutes a part of the vehicle 30. However, the present invention is not limited thereto. For example, a navigation device may have the function of the display unit 320 or the voice communication unit 330. Further, a mobile phone or laptop computer, a tablet terminal, a personal digital assistant (PDA), a portable music player, a portable game machine, etc., may have the function of the display unit 320 or the voice communication unit 330.

D2. Modified Example 2:

The recognition unit 350 may be a laser scanner. The laser scanner is a kind of an electronic distance meter. The laser scanner irradiates a near-infrared pulse laser beam while rotating an irradiation direction by a rotating mirror inside a laser header. A reflected light reflected from a measurement target point is detected. A pulse propagation time of the laser beam is detected by a phase comparison method, or the like. In this way, a distance to the measurement target point is measured. Simultaneously, the irradiation direction of the pulse laser beam is measured, so that the coordinates of the measurement target point are obtained. From the coordinate point group obtained from the laser scanner, planimetric features such as the traffic light are recognized.

What is claimed is:

1. A driving support system for supporting a driving of a vehicle, the driving support system comprising:

a detector that detects a present position of the vehicle;
a memory that stores first lane information of a first travelling lane and first traffic light information in a state of being associated with each other, the first traffic light information including existing position information of a first traffic light, and that stores second lane information of a second travelling lane and second traffic light information in a state of being associated with each other, the second traffic light information including existing position information of a second traffic light, the first traffic light informing whether the vehicle travelling along the first travelling lane is allowed to pass through the first traffic light, and the second traffic light informing whether the vehicle travelling along the second travelling lane is allowed to pass through the second traffic light; and
a controller that specifies a travelling lane on which the vehicle is travelling based on the present position, that supports the driving of the vehicle in accordance with the first traffic light information of the first traffic light associated with the first travelling lane when the vehicle travels along the first travelling lane, and that supports the driving of the vehicle in accordance with the second traffic light information of the second traffic light associated with the second travelling lane when the vehicle travels along the second travelling lane.

2. The driving support system according to claim 1, wherein the controller supports the driving of the vehicle by informing a vehicle driver of the first traffic light or the second traffic light, or by controlling an accelerator or a brake of the vehicle.

3. A driving support system for supporting a driving of a vehicle, the driving support system comprising:

a detector that detects a present position of the vehicle;
a memory that stores first lane information of a first travelling lane and first traffic light information in a state of being associated with each other, the first traffic light information including existing position information of a first traffic light, the first traffic light informing whether the vehicle travelling along the first travelling lane is allowed to pass through the first traffic light, and that stores second lane information of a second travelling lane and second traffic light information in a state of being associated with each other, the second traffic light information including existing position information of a second traffic light, and the second traffic light informing whether the vehicle travelling along the second travelling lane is allowed to pass through the second traffic light;
a recognition unit that recognizes a display content of the first traffic light or the second traffic light; and
a controller that specifies the first travelling lane or the second travelling lane as a lane on which the vehicle is travelling based on the first lane information or the second lane information, and based on the present position, and that supports the driving of the vehicle in accordance with the first traffic light information or the second traffic light information, and in accordance with the display content of the first traffic light or the second traffic light associated with the specified lane.

4. The driving support system according to claim 3, wherein the memory further stores a first stop line position information indicating a position of a stop line associated with the first traffic light, and a second stop line position information indicating a position of a stop line associated with the second traffic light, wherein the controller supports the driving of the vehicle so as to stop the vehicle at the position of the first stop line associated with the first traffic light when the recognition unit recognizes the display content of the first traffic light as a display content which prompts to stop the vehicle, and wherein the controller supports the driving of the vehicle so as to stop the vehicle at the position of the second stop line associated with the second traffic light when the recognition unit recognizes the display content of the second traffic light as a display content which prompts to stop the vehicle.

5. The driving support system according to claim 3,
wherein the controller supports the driving of the vehicle by informing a vehicle driver of the first traffic light or the second traffic light, or by controlling an accelerator or a brake of the vehicle.

6. A driving support method for supporting a driving of a vehicle, the driving support method comprising:
   detecting a present position of the vehicle;
   storing first lane information of a first travelling lane and first traffic light information in a state of being associated with each other, the first traffic light information including existing position information of a first traffic light, the first traffic light informing whether the vehicle travelling along the first travelling lane is allowed to pass through the first traffic light;
   storing second lane information of a second travelling lane and second traffic light information in a state of being associated with each other, the second traffic light information including existing position information of a second traffic light, and the second traffic light informing whether the vehicle travelling along the second travelling lane is allowed to pass through the second traffic light;
   specifying a travelling lane on which the vehicle is travelling based on the present position; and
   supporting the driving of the vehicle in accordance with the first traffic light information of the first traffic light associated with the first travelling lane when the vehicle travels along the first travelling lane, and that supports the driving of the vehicle in accordance with the second traffic light information of the second traffic light associated with the second travelling lane when the vehicle travels along the second travelling lane.

7. A non-transitory computer-readable storage medium having stored thereon a program, which when executed by a computer causes the computer to execute operations of supporting a driving of a vehicle, the operations comprising:
   storing a plurality of pieces of lane information of a plurality of travelling lanes, where the plurality of travelling lanes are positioned adjacent to each other within a road, each travelling lane being related to a respective piece of lane information;
   storing a plurality of pieces of traffic light information that each includes existing position information of a respective traffic light, the respective traffic light which informs whether the vehicle travelling along a respective one of the travelling lanes is allowed to pass through the respective traffic light;
   associating each one of the plurality of pieces of lane information with a respective one of the plurality of pieces of the traffic light information;
   specifying a travelling lane on which the vehicle is travelling based on a present position of the vehicle, to support the driving of the vehicle in accordance with a first traffic light information of a first traffic light associated with a first travelling lane when the vehicle travels along the first travelling lane, and to supports the driving of the vehicle in accordance with a second traffic light information of a second traffic light associated with a second travelling lane when the vehicle travels along the second travelling lane,
   wherein traffic light information associated with the first travelling lane is different from traffic light information associated with the second travelling lane.

8. A non-transitory computer-readable storage medium which stores data for causing a controller to execute operations of supporting a driving of a vehicle, the data comprising:
   a plurality of pieces of lane information of a plurality of travelling lanes, wherein the plurality of travelling lanes are positioned adjacent to each other within a road, each travelling lane being related to a respective piece of lane information; and
   a plurality of pieces of traffic light information that each includes existing position information of a respective traffic light, the respective traffic light which informs whether the vehicle travelling along a respective one of the travelling lanes is allowed to pass through the respective traffic light, each one of the plurality of pieces of the traffic light information in a state of being associated with a respective one of the plurality pieces of lane information,
   wherein the controller supports the driving of the vehicle in accordance with a first traffic light information of a first traffic light associated with a first travelling lane when the vehicle travels along the first travelling lane, and supports the driving of the vehicle in accordance with a second traffic light information of a second traffic light associated with a second travelling lane when the vehicle travels along the second travelling lane, based on a present position of the vehicle, and
   wherein traffic light information associated with the first travelling lane is different from traffic light information associated with the second travelling lane.

9. The driving support system according to claim 1,
wherein the memory further stores a first stop line position information indicating a position of a stop line associated with the first traffic light, and a second stop line position information indicating a position of a stop line associated with the second traffic light.

10. The driving support system according to claim 1,
wherein the controller supports the driving of the vehicle by initiating a displaying of a focus in association with a respective traffic light associated with the specified travelling lane.

11. The driving support system according to claim 1,
wherein the controller supports the driving of the vehicle by initiating an outputting of a sound.

12. The driving support system according to claim 3,
wherein the display content is associated with an output signal of the first traffic light or the second traffic light.

13. The driving support system according to claim 1,
wherein the detector and the controller are each implemented via at least one processor.

14. The driving support system according to claim 3,
wherein the detector, the recognition unit, and the controller are each implemented via at least one processor.

* * * * *